Sept. 1, 1931.   H. A. DAVOL   1,821,830
FRICTION DEVICE FOR SHUTTLES
Filed Jan. 26, 1928   2 Sheets-Sheet 1

INVENTOR.
Harry Alton Davol
BY
Gardner W. Pearson
ATTORNEY.

Sept. 1, 1931.  H. A. DAVOL  1,821,830
FRICTION DEVICE FOR SHUTTLES
Filed Jan. 26, 1928  2 Sheets-Sheet 2

Patented Sept. 1, 1931

1,821,830

UNITED STATES PATENT OFFICE

HARRY ALTON DAVOL, OF METHUEN, MASSACHUSETTS, ASSIGNOR TO U. S. BOBBIN & SHUTTLE COMPANY 1929, OF PROVIDENCE, RHODE ISLAND, A CORPORATION OF RHODE ISLAND

FRICTION DEVICE FOR SHUTTLES

Application filed January 26, 1928. Serial No. 249,640.

This invention relates to shuttles particularly of the type in which there is a metal threading block, and its particular purpose is to provide an adjustable friction device whereby the friction of the thread from the bobbin, as the shuttle travels in a loom, can be controlled.

The advantages of this device are that it can be quickly and accurately adjusted and when adjusted will remain in the desired condition while the wearing parts can be made of hardened steel or other very hard material to resist wear, and all of the parts subject to wear or deterioration like the spring and friction members, can be readily replaced.

It comprises a movable friction member which preferably rests on a removable or replaceable friction block, such friction member being kept in position by means of a screw pin, the shank of which passes through a pin hole in this member and by means of one or more vertically extending tongues which serve as guides for the thread.
One of the tongues enters a guide tongue recess while the other, if another is used, engages a tongue guide whereby the friction member is kept in place. It also includes the screw pin and a spring member or elastic member the force of which can be regulated by turning the screw.

Another advantage of my construction is that my screw pin takes the place of the usual thread pin as it can be located directly behind what is known as the horn and opposite the shuttle eye.

When serving as a thread pin to direct the thread at right angles out of the shuttle eye, the part behind the horn must be cut away and cannot serve to hold the friction member in position as described in another application for patent of mine pending herewith.

In the drawings, Fig. 1 is a plan view of a shuttle with a shuttle block carrying my device partly broken away to show the construction.

Fig. 6 is a view showing part of the shuttle block on the side opposite to what is shown in Fig. 2.

Fig. 7 is a view of part of a modified type of shuttle block removed from the shuttle and as viewed from the side opposite the shuttle eye.

Fig. 8 is a plan view of my top friction plate removed from the shuttle block.

Fig. 9 is a fragmentary view similar to Fig. 7 with parts broken away showing a modification.

Fig. 10 is a fragmentary view of a shuttle block from the side opposite the shuttle eye of another modification.

Fig. 11 is a detail, showing a preferred construction of certain parts.

Fig. 12 is a view similar to Fig. 11 showing a different construction of certain parts.

Fig. 13 is a detail showing a set screw.

Fig. 14 is a view of a modification as viewed looking down on a horizontal section taken on a plane which passes between the friction block and friction member.

Fig. 15 is a section on the line 15—15 of Fig. 14 looking in the direction of the arrows.

Figure 1:
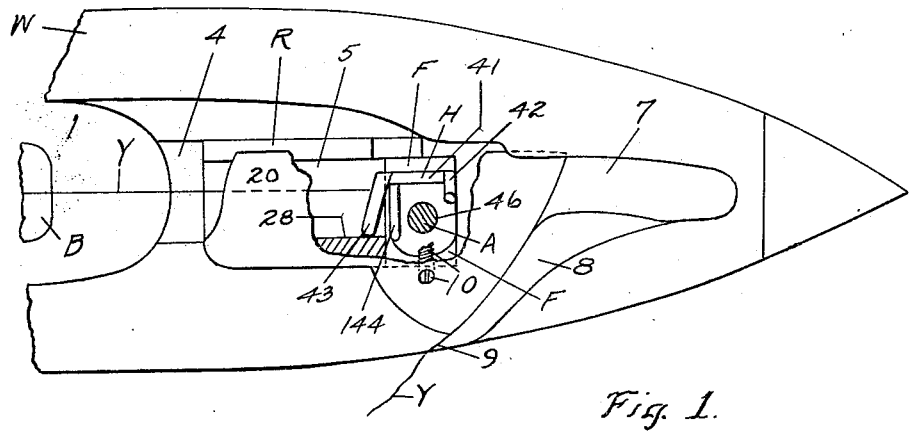

In the accompanying drawings, W indicates the body of a shuttle having a bobbin recess 1 in which is positioned the bobbin B of the usual kind and from which the thread Y extends through the usual threading chamber 4 in the wood, and the connecting threading chamber 5 in the threading block R from which in threading it rests in the threading groove 7, and after it is threaded, it passes through channel 8 and thence out the shuttle eye 9 in the wood.

Figure 2:
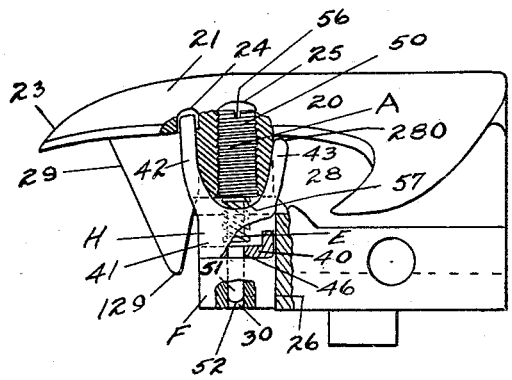
Fig. 2 is an elevation of the shuttle block
50 removed from the shuttle viewed from the direction opposite the eye in the wood with parts broken away.
Figure 3:
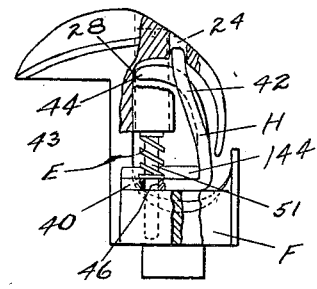
Fig. 3 is a front elevation of Fig. 2 with parts broken away to show the construction.
Figure 4:
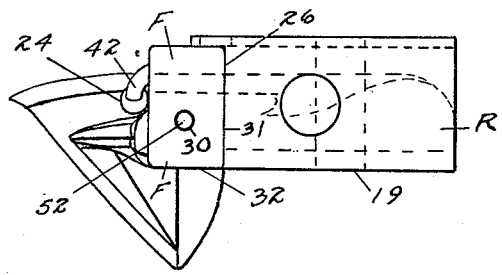
Fig. 4 is a bottom view of Fig. 2.
Figure 5:
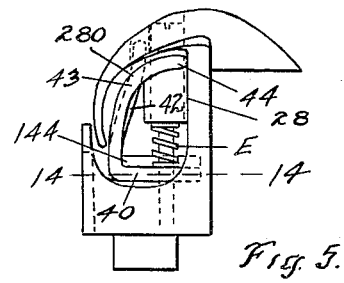
Fig. 5 is a back view of the shuttle block removed from the shuttle.

The threading block R, as shown in Figs. 1 to 6, has in its side wall a vertical tongue guide 28 and a top guide 20 which extends or slopes downward at 21 into chamber 5 and preferably extends forward and down 100 at 23 to form a sort of nose or front guide. It has in its underside and preferably extending up through the top a tongue recess 24 and at the bottom a friction block recess 26, and positioned above said recess a threaded screw pin head hold 25. 29 represents what is generally known as the horn which starts slightly back of the end 23 and slopes down and back to a point 129, preferably slightly below the top edge of friction block F, positioned in recess 26, and the bottom of the friction member H.

As shown in Figs. 1 to 4, the block F is substantially rectangular, one edge 31 being substantially straight and engaging an edge of recess 26 and another edge 32 being substantially straight and in prolongation of a side edge 19 of block R.

The friction member H is formed with a base 40 in which is a pin hole 46, into which the bottom end 52 of the shank of screw pin A enters. Base 40 normally rests on friction block F and friction member H has a side wall 41, which as shown in Figs. 1 to 4 is formed with or comprises two upwardly projecting guide tongues 42 and 43. 42 is shown as straight and as positioned forward of screw pin A, and its top end enters tongue recess 24 in the friction block while the top end 44 of the other tongue 43 engages the tongue guide 28. It is bent at 280 to accomplish this.

The side wall of friction member such as H whether it has a single guide tongue or more than one guide tongue or is flat as shown in Fig. 10 serves to guide the thread and to keep it from becoming entangled with the spring. It also serves to prevent the friction member from turning around.

The screw pin A has a threaded end or head 50 with a turning slot 56 and an annular shoulder 57 below which the shank 51 extends. Its end 52 passes through the pin hole 46 in base 40 and into the pin hole 30 in friction block F.

As shown in Figs. 1 to 4, for an elastic tension member, I use a spiral spring E surrounding shank 51 and positioned between the lower end 57 of head 50 and the base 40 of friction member H.

As shown in Fig. 8, the edge 140 of base 40 of the friction member can be rounded or of any convenient shape as the screw pin and tongues hold member H in place.

In Fig. 7, I show a shuttle block 60 in which is a block recess 61 for friction block F, a threaded screw pin head hole 62 for screw pin A and two tongue recesses 63 and 64, neither of which passes through block 60. The movable friction member L has a base 65 with a pin hole 66 and a side wall 67 from which project upwardly the two guide tongues 68 and 69, the ends of which are straight and enter respectively the tongue recesses 63 and 64.

In place of a spring, I show a section of rubber tube M which encircles the shank of the screw pin and extends between its head and the base of friction member L.

In Fig. 9, I show the end 52 of the shank of screw pin A passing into but not through a pin hole 223 in friction block 224 which rests in a recess 225 in shuttle block 226, such recess however not passing through the bottom of 226 but having a bottom 227 on which block 224 rests.

In Fig. 10 the shuttle block 119 has no friction block recess but only a pin hole 126 into which the end 52 of the screw pin enters, but the lower part 127 of the threading chamber is flat and on this rests the base 70 of movable friction member K which instead of one or more tongues has a side guide wall or plate 71 which extends up to 72 and enters a wide flat recess 124 adjoining the threaded head hole 125 in the top guide 126 of threading block 119.

The top 221 of friction block 224 or of any friction member such as F may be regarded as part of the bottom such as 222 of the threading chamber, or as merging with it at 127. Preferably it extends above the rest of the bottom to allow for wear.

Preferably also, as shown in Fig. 11, the upper back edge 34 of the block is rounded and the bottom back edge of the friction member H is rounded and bent upward as 144 so that the thread Y can slip smoothly through.

As shown in Fig. 12 however the upper back edge 33 of block F and the lower back edge 143 of member H may be cut at right angles so as to stop any slubs carried by the thread Y and break the thread.

The web such as 118 back of the horn 29 may drop well down toward the top face of the threading block or the bottom face of the threading chamber to assist the thread in slipping in between the friction member and the friction block but this is unnecessary because in unwinding from the bobbin, the thread slips over the outside of the friction member H and down between it and the friction block so that it is already between them on the next pick of the shuttle when it slips down over the horn and runs out through the shuttle eye.

I may provide a set screw such as 11 which passes in through the threading block R through a passage 10 to engage screw pin A and keep it from turning or getting out of place. This can be turned by slot 12.

As shown in Figs. 14 and 15, I may use a shuttle block 70 in wood recess 72 having a threading chamber 71 and a cylindrical recess 73 for a porcelain disc 74 perforated by a pin hole 75 for screw pin A which also extends through hole 76 in block 70 and into hole 77 in wood W. Disc 74 may crawl and present a new part to the thread Y but will not spin around with it. It therefore serves as a friction member.

I claim:

1. The combination in a threading block for shuttles in which is a threading chamber one wall of which is formed with a vertical tongue guide and which has a top guide which slopes downward into said chamber, said top guide having in its under side a tongue recess and said block having in its bottom part a friction block recess and a vertical threaded screw pin head hole positioned above said recess; of a friction block positioned in said block recess and having a pin hole; a friction member formed with a base in which is a pin hole said base resting on the friction block and said friction member having a side wall comprising two upwardly projecting guide tongues, one positioned forward of the screw pin and the other behind it, the top end of the forward tongue entering into the tongue recess and the end of the other being bent over to engage the tongue guide; a screw pin having a threaded head which is screwed into the screw pin head hole and a shank which passes through the pin hole in the base of the friction member and into the hole in the friction block; and a tension spring which surrounds the shank of the screw pin between its head and the base of the friction member.

2. The combination in a threading block for shuttles in which is a threading chamber and which has a top guide which slopes downward into said chamber, said top guide having in its underside a tongue recess and said block having in its bottom part a friction block recess and a vertical threaded screw pin head hole positioned above said recess; of a friction block positioned in said block recess and having a pin hole; a friction member formed with a piece in which is a pin hole; said base resting on the friction block and said friction member having a side wall comprising a guide tongue the top end of which enters the tongue recess; a screw pin having a threaded head which is screwed into the screw pin head hole and a shank which passes through the pin hole in the base of the friction member and into the hole in the friction block; and tension means between the head of the screw pin and the base of the friction member.

3. The combination in a threading block for shuttles in which is a threading chamber and which has a top guide which slopes downward into said chamber said guide having in its underside a tongue recess and having a vertical threaded screw pin head hole; of a friction member formed with a base in which is a pin hole said base resting on the bottom of the threading chamber and said friction member having a side wall comprising a guide tongue the top end of which enters the tongue recess; a screw pin having a threaded head which is screwed into the screw pin head hole and a shank which passes through the pin hole in the base of the friction member; and tension means between the head of the screw pin and the base of the friction member.

4. The combination in a threading block for shuttles in which is a threading chamber and which has a top guide through which is a vertical threading screw pin head hole; of a friction member formed with a base in which is a pin hole, said base resting on the bottom of the threading chamber, and said friction member having a side wall comprising a guide tongue which extends up to the top guide; a screw pin having a threaded head which is screwed into the screw pin head hole and a smooth shank which passes through the pin hole in the base of the friction member and serves as a guide pin to direct the thread out through the guide eye; and tension means between the head of the screw pin and the base of the friction member.

5. The combination in a threading block for shuttles in which is a threading chamber and which has a top guide through which is a vertical threaded screw pin head hole; of a friction member formed with a base in which is a pin hole, said base resting on the bottom of the threading chamber; a screw pin having a threaded head which is screwed into the screw pin head hole, and a smooth shank which passes through the pin hole in the base of the friction member and serves as a guide pin to direct the thread out through the shuttle eye; and tension means between the head of the screw pin and the base of the friction member.

HARRY ALTON DAVOL.